Patented Dec. 18, 1928.

1,695,372

UNITED STATES PATENT OFFICE.

WALTER FLEMMING, OF LUDWIGSHAFEN, AND HANS KLEIN, OF MANNHEIM, GERMANY, ASSIGNORS TO SILESIA, VEREIN CHEMISCHER FABRIKEN, IDA-UND MARIENHUETTE, OF SARRAU, GERMANY.

PROCESS FOR THE SEPARATION OF MONO- AND DIALKYL DERIVATIVES OF AROMATIC AMINES.

No Drawing. Application filed November 3, 1927, Serial No. 230,923, and in Germany November 19, 1926.

It is known that mono-alkyl derivatives of aniline and other aromatic amines react as follows with phthalic anhydride:—

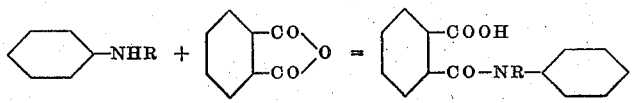

In the equation R represents an alkyl group. If proportions corresponding to the equation are employed, the reaction is not quantitative and is therefore not suitable for the separation of mono- and dialkylated aromatic amines. Piutti has attempted to purify diethylaniline by means of phthalic anhydride (Liebigs Annalen, vol. 227, page 181) but although he employs a diethylaniline which has already been purified to a considerable extent by distillation, his process is very lengthly and owing to the necessity of repeatedly distilling the high-boiling diethylaniline, is too expensive.

It has been found that the reaction between mono-alkylated aromatic amines and phthalic anhydride takes place in one operation in a few minutes and with practically quantitative results, if the reaction is carried out in a neutral solvent. It is not necessary to apply heat in such a case, contrary to Piutti, who boils under a reflux condenser. This forms the basis of the new process described hereinafter, for the separation of mono- and dialkylated aromatic amines. A preliminary rough purification of the mixture to be separated, for instance by distillation is not necessary here. The process is applicable for instance to the amine mixtures obtained in the industrial alkylation of aromatic amines with an excess of alkylating agent.

Before carrying out the separation, the amount of mono-alkylated aromatic amine in the mixture is determined in the usual way. The amine mixture is thereupon dissolved in benzene or toluene and a little more than the quantity of phthalic anhydride disclosed by the equation is added. Phthalic anhydride is only slightly soluble in benzene and remains at the bottom to begin with. By stirring or shaking however, the reaction shown by the equation takes place, the mixture becoming slightly warm. The phthalic anhydride is converted into the corresponding phthaliminic acid, which is soluble in benzene. If the mixture is now shaken with an aqueous solution of sodium hydroxide, the phthaliminic acid passes in the form of a salt into the aqueous layer, while the dialkylated aromatic amine remains in the benzene layer and can be readily separated therefrom by distillation. The phthaliminic acid in the aqueous layer is split up by boiling with dilute mineral acid, and the components, viz phthalic acid and mono-alkylated aromatic amine, are separated in the usual way.

Example.

207 gs. of a mixture containing 52% monomethylaniline and 48% dimethylaniline, is dissolved in 300 gs. benzene and 150 gs. phthalic anhydride added to this solution. The mixture is shaken for 15 minutes in a well closed bottle. The solution which is now clear is shaken out with a dilute solution of sodium hydroxide (50 gs. NaOH to 500 water). The two layers are separated in a separating funnel. The benzene layer contains the dimethylaniline, which is obtained pure by distilling off the benzene. Yield 93 gs. The aqueous layer is acidified with a solution of 70 ccm. conc. sulphuric acid of 66° Bé in 200 water. The free phthaliminic acid then separates out first of all as a semi-solid oil, which is split by heating the mixture. After cooling it is filtered off from the separated phthalic acid. The filtrate is made alkaline with soda solution, the separated methylaniline is dissolved in benzene and separated in the separating funnel. In this case too the monomethylaniline is obtained pure by distilling off the benzene. Yield 98 gs. Some monomethylaniline of course passes over with the benzene, but is not lost, as the benzene can be re-introduced at the same point in the next operation. The same applies to the benzene distilled off from dimethylaniline.

What we claim is:—

1. A process for separating mono- and dialkylated aromatic amines consisting in dissolving the mixture of the amines in a neutral solvent, adding phthalic anhydride to convert the monoalkylated amine into the corresponding phthaliminic acid and separating the latter from the neutral solvent solution by shaking with an aqueous solution of alkali.

2. A process for separating mono- and dialkylated aromatic amines consisting in dissolving the mixture of the amines in benzene, adding phthalic anhydride to convert the monoalkylated amine into the corresponding phthaliminic acid and separating the latter from the benzene solution by shaking with an aqueous solution of alkali.

3. A process for separating mono- and dialkylated aromatic amines consisting in dissolving the mixture of the amines in benzene, adding phthalic anhydride to convert the monoalkylated amine into the corresponding phthaliminic acid and separating the latter from the benzene solution by shaking with an aqueous solution of sodium hydroxide.

In testimony whereof we have signed our names to this specification.

WALTER FLEMMING.
HANS KLEIN.